United States Patent
Beasley et al.

(10) Patent No.: US 7,653,181 B2
(45) Date of Patent: Jan. 26, 2010

(54) METHOD OF CREATING AND MANAGING A CUSTOMIZED RECORDING OF AUDIO DATA RELAYED OVER A PHONE NETWORK

(75) Inventors: John Richard Beasley, Cary, NC (US); Michael Cruzcosa, Austin, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 130 days.

(21) Appl. No.: 10/144,727

(22) Filed: May 15, 2002

(65) Prior Publication Data

US 2003/0215063 A1    Nov. 20, 2003

(51) Int. Cl.
*H04M 1/64* (2006.01)
(52) U.S. Cl. .................. 379/67.1; 379/68; 455/412.1
(58) Field of Classification Search ............. 379/88.13, 379/88.14, 88.18, 88.23, 88, 67.1; 455/563, 455/557, 414.1–414.4, 556.1, 412.1, 413
See application file for complete search history.

(56) References Cited

U.S. PATENT DOCUMENTS

| | | | | |
|---|---|---|---|---|
| 5,926,524 A | * | 7/1999 | Taylor .................. | 379/88.08 |
| 6,167,255 A | * | 12/2000 | Kennedy et al. ........ | 455/414.1 |
| 6,330,079 B1 | * | 12/2001 | Dugan et al. ............ | 358/403 |
| 6,501,956 B1 | * | 12/2002 | Weeren et al. ............ | 455/463 |
| 6,765,998 B2 | * | 7/2004 | Bruce et al. ............ | 379/88.18 |
| 7,298,830 B2 | * | 11/2007 | Guedalia et al. ........ | 379/88.17 |
| 7,359,491 B2 | * | 4/2008 | Liu et al. ................ | 379/68 |
| 2001/0056351 A1 | * | 12/2001 | Valentine et al. ........ | 704/270 |
| 2002/0067805 A1 | * | 6/2002 | Andrews ................ | 379/67.1 |
| 2003/0032448 A1 | * | 2/2003 | Bulthuis et al. .......... | 455/556 |
| 2003/0037100 A1 | * | 2/2003 | Olejar et al. ............ | 709/203 |

\* cited by examiner

*Primary Examiner*—Nay A Maung
*Assistant Examiner*—Angelica M Perez
(74) *Attorney, Agent, or Firm*—Harness, Dickey & Pierce

(57) ABSTRACT

The method of recording and managing audio data transmitted to a user via a phone network includes receiving audio commands from the user to record user selected data relayed to the user from a database, recording the user selected data in a database and storing the data for management by the user. A user may receive an audio or visual readout of the stored data, transmit the data, delete data records, and organize data records.

25 Claims, 2 Drawing Sheets

METHOD OF CREATING AND MANAGING A CUSTOMIZED RECORDING OF AUDIO DATA RELAYED OVER A PHONE NETWORK

BACKGROUND OF THE INVENTION

1. Field of the Invention

This invention relates to the field of telecommunications, in particular a method of creating a customized recording of audio data relayed over a phone network and managing the data.

2. Background Art

As shown in FIG. 1, a phone user is able to connect a phone 1 to various computer networks 3 via the phone network 2. The user of a phone 1 is able to interact with the computer network 3 as directed by the user with the assistance of services 4 such as interactive voice response systems, voice mail, and direct access to the Internet or distributed database.

The services 4 process and present data to the user as an audio read out such as text-to-speech or a pre-recorded audio message. The information requested by the user may originate from one or more databases associated with one or more computer networks or the Internet. The services 4 retrieve and process the data from the appropriate data source(s) based on a user request and presents a response to the user via the phone network. The response may be data relayed in audio format via text-to-speech or a pre-recorded audio message. For example, the network services 4 permits a user to call the computer network 3 of his bank and receive an audio read out of their banking information.

While a user may access a multitude of services with a single phone call and the services 4 allow the user to select specific data to be read out, the services 4 do not provide the user with a log or permanent recording of the data accessed during the call or a method of managing the data that has been provided during the call. The services 4 may assemble, store, and present the data to the user while the call is active, but a separate instance of the data is not available to the user after the call is complete. Thus, the data shared with the user during the call is transient. If the user wishes to replay the data after the call is complete, the user must contact the service again and resubmit the request. If the user wishes to record the data, the user is left to his or her own methods of recording such as his or her memory or hand written notes.

SUMMARY

The method of the present invention provides a secure mechanism for recording and managing data read out to a user from a computer network via the user's phone and associated phone network. The method allows a user to dynamically create a custom instance of data accessed from a computer network during the phone call that the user can manage separate from the source data. This eliminates the need for users to rely on their memory and handwritten notes to record audio or text data readout from the computer network and enables the user to perform operations and management functions on the data during the call and after the call is complete. The user can send a copy of the data to other network devices, such as other wireline and wireless phones, email accounts, and PDAs. The user can also access and manage the data using the Internet. The data stored may include text and binary files such as recorded audio files.

BRIEF DESCRIPTION OF DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE INVENTION

As described below, the method of this invention provides customized storage of data (including audio and text) relayed over a network and manages the customized recording of the data.

Figure 1:
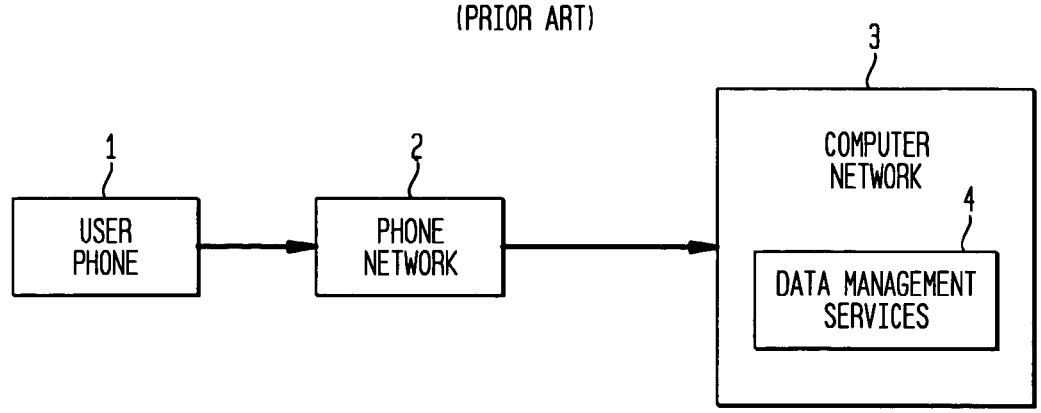
FIG. 1 depicts a prior art phone connection to a computer network via a phone network.
Figure 2:
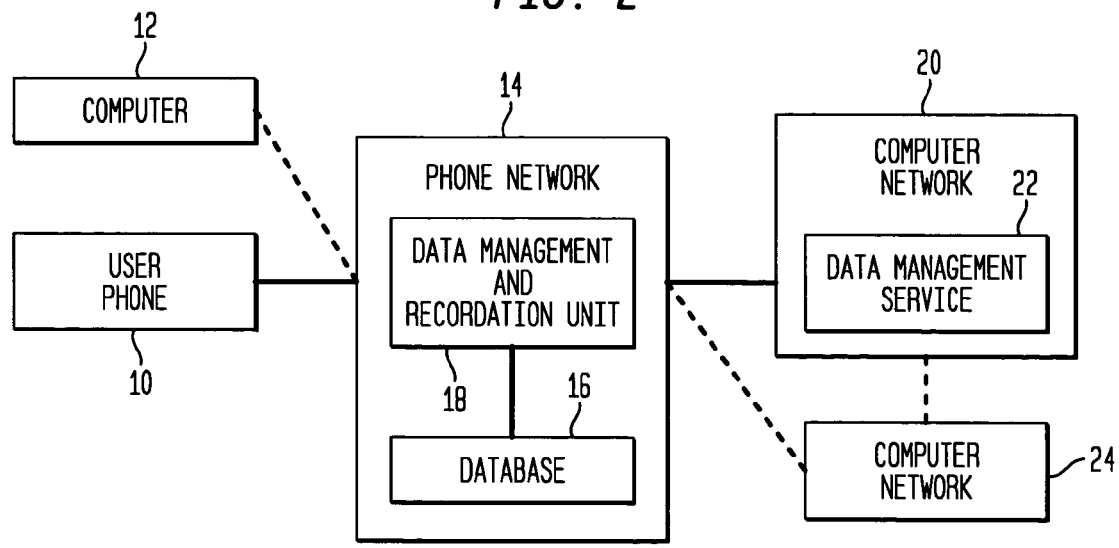
FIG. 2 depicts a phone connection to a computer network via a phone network having the data management and recordation unit of the invention.

As shown in FIG. 2, according to one embodiment of the present invention, a user is able to connect a phone 10 (i.e. telephone, cell phone) to a phone network 14, which has an associated data management and recordation unit 18. The data management and recordation unit 18 may be embodied in one processor or unit, as shown in FIG. 2, or separate processors. Additionally, the data management and recordation unit 18 may store data in and interact with a database 16, which is also associated with the phone network 14. The phone network 14 allows the user to connect a phone to a desired computer network 20 and access data in the computer network 20 via data management services 22, which are associated with the computer network 20. The present invention does not specifically require that the data management and recordation unit 18 and database 16 be directly associated with the phone network 14. The data management and recordation unit 18 and database 16 may be associated with a computer network 20 that hosts the data management service 22. The data management and recordation unit 18 and database 16 may also be associated with a separate computer network 24 that has connectivity to the phone network 14 and the computer network 20.

The computer network 20 stores the relevant data in databases. The services 22 such as interactive voice response systems, voice mail, direct connections to a distributed database, and other services provide the data to the user in an audio format. Such formats may include pre-recorded messages or text spoken using a text-to-speech (TTS) device.

The phone network 14 may be a wireless phone network, landline phone network, voice over broadband data network or any other network, which relays audio data.

Figure 3:
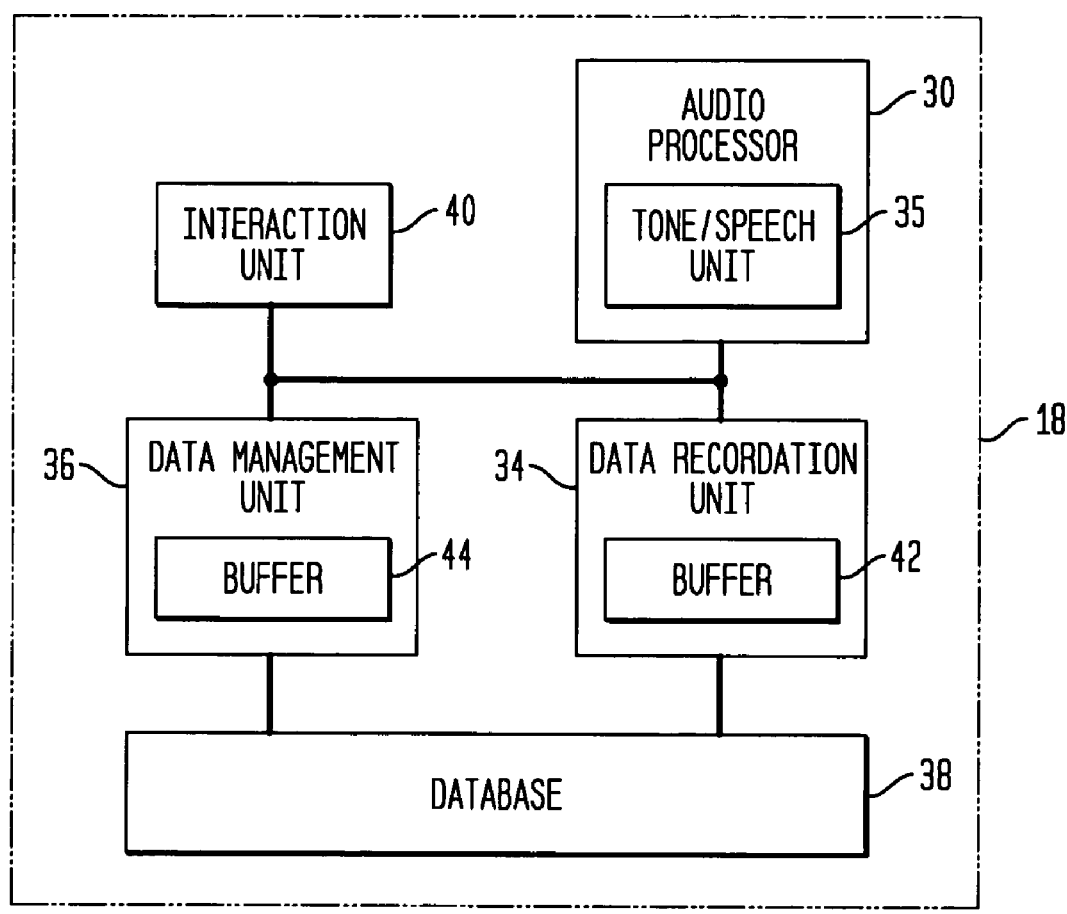
FIG. 3 depicts the data management and recordation unit of the invention.

FIG. 3 depicts one embodiment of the data management and recordation unit 18. The data management and recordation unit 18 includes an audio processor 30 with a tone recognition/speech recognition unit 35. The audio processor 30 is in communication with a data recordation unit 34, which records the audio data, relayed to the user and a data management unit 36, which manages the recorded data. Both the data recordation unit 34 and the data management unit 36 are in communication with a database 38 that may be within the data management and recordation unit 18, as shown in FIG. 3, or external to the unit 18, as shown by database 16 in FIG. 2. Additionally, the data management and recordation unit 18 includes an interaction unit 40 in communication with the data recordation unit 34 and data management unit 36 and provides interaction between the user and the data management and recordation unit 18. The interaction unit 40 is capable of authenticating the identity of the user to ensure secure access. This authentication may be based on a number of techniques, such as a numeric password entered by the user on the phone keypad, a verbal password spoken by the user or speech recognition based on a verbal phrase spoken by the user.

The database 38 may have one or several folders corresponding to each phone user, and each user may have one or several folders for storing data, for example by subject. The database 38 is able to store user records according to a standard filing system or the filing system developed by the user. For example, a user may designate storage locations such as specific file folders for categories including bank records, phone messages, appointments, business records, etc. Additionally, the user may store the electronic facsimile numbers, voice mail addresses, email address and other addresses for recipients that a user may wish to send a copy of the data. This may also include addresses for telecommunications devices associated with the user, in the event that the user wishes to send himself or herself a copy of the data in an alternate format.

The data management and recordation unit 18 operates upon receipt of commands from the phone user. The commands may take various forms including a verbal command from the user such as words, a tone or tones generated by pressing the buttons of the phone and/or other electrical signals. For example, a phone user may state "Note that" to direct the data management and recordation unit 18 to record the audio data currently being read out from the computer network 20. Also, depressing a particular button on the phone may command the recording of data.

The data management and recordation unit 18 is capable of executing a variety of commands such as commands to record data, transmit data, list data records, delete data records, open data records, place data records in a particular location in the database 38 and other data management methods.

The tone/speech recognition unit 35 receives the commands. The tone/speech recognition unit determines the form of command, for example, if the command is speech or a tone. If the command is speech, the audio processor 30 transforms the command to a format usable by the data recordation unit 34 and data management unit 36 such as code. Likewise, if the command is tonal, the audio processor 30 transforms the tone to a format usable by the data recordation unit 34 and data management unit 36 such as code.

The audio processor 30 also determines the nature of the command and routes the command to the data recordation unit 34 and the data management unit 36 as appropriate.

Upon receiving the proper command, the data recordation unit 34 will perform a variety of tasks including recording, transmitting, and managing the data relayed from the computer network in database 38. Recording occurs, for example, as the user hears the audio data relayed from the computer network 20 via service 22 and the phone network 14 and issues the proper command. As discussed above, the command could be, "Note that" or a tone created by depressing a button on the phone, or any other suitable phrase or signal. Upon receipt of the record command, the data recordation unit 34 may place the data into database 38 and store the data as a "note".

Additionally, the data recordation unit 34 allows the user to manage the data upon issuance of the proper commands. Once the user has issued the record command, the user may also issue commands as to where to store the data. To determine the storage location, after the user states "Note that" the data recordation unit 34 will direct the interaction unit 40 to ask the user, using an appropriate audio speech question or a tone signal corresponding to the question, as to which folder to store the data. Next, the user will respond with the appropriate folder such as "business records". As a result, the business records folder will contain "notes" pertaining to business records.

The user may direct the data recordation unit 34 to edit the data. This command may be used when the audio readout is lengthy or contains more information than the user wishes to store and the user wishes to record only a subset of the audio readout. This command may be made as the audio data is being readout to the user and/or may be made by the user before or after the user instructs the data recordation unit to store the data. Upon receipt of the edit command from the user, the data recordation unit 34 plays back the audio readout and directs the interaction unit 40 to ask the user to designate the beginning and end of the segment that the user would like to store. Depending on the complexity of the application, specialized editing functions can be implemented in the interaction unit 40 to assist in editing such as Fast Forward, Rewind and Search On Keyword. If the edit is made before the copy of the audio readout is stored in the database, the complete audio readout is stored in a temporary buffer associated with the data recordation unit 34 while the user is making the edits. The data (complete copy or a partial segment) is not stored in the database 38 until the user requests that the data be stored. Depending on whether the database 38 is capable of storing multiple data records, the user may have the option of storing the complete copy of the audio readout as well as multiple edited segments. Each copy and/or segment is stored as a separate data instance and can be transmitted, further edited or deleted separately.

The user may also direct the data recordation unit 34 to transmit the data. This command may be made as the audio data is being readout to the user, and/or may be made by the user before or after the user commands the recordation of data. Upon receipt of a transmit command from the user, the data recordation unit 34 electronically transmits the data to a user designated recipient. The transmission may occur via facsimile, voice mail, e-mail, etc. as specified by the user in the command. If the transmission occurs by facsimile, the data will be converted to a text message, if necessary, and transmitted as a text message. If the transmission occurs by voice mail, the data will be converted to an audio message, if necessary, and transmitted as an audio message. However, if the transmission is by e-mail, the data recordation unit 34 will append the stored data (text or audio) to the message. The recipient's address, fax number and other associated data may be stored in the database 38 or entered by the user at the time of the command to transmit.

The transmission command may include for example, the user stating, "transmit to assistant by fax". Upon receipt of the transmit command, the data recordation unit 34 begins processing to transmit the note. If the recipient is not named or the recipient's address is not known, the data recordation unit 34 directs the interaction unit 40 to ask the user questions as necessary to complete each specific transmission. For example, the data recordation unit 36 may direct the interaction unit 40 to ask, "Who is the recipient?" The user may then state the appropriate recipients for the message. The audio processor 30 relays the recipients to the data recordation unit 34, and the data recordation unit 34 searches the appropriate section or folder of database 38 to determine the appropriate address. If no record is found of a specific recipient's address, the data recordation unit 34 directs the interaction unit 40 to state, "What is the recipient address?" If more than one record is found such as an email and voice mail address, the data recordation unit 34 may ask, "at which address?"

Upon receipt of a command to record or transmit data, the data recordation unit 34 creates a data record in database 38.

This data record is a copy of the data that was retrieved from the computer network 20 via service 22 and relayed to the user in audio format over the phone network 2. Depending on the embodiment of the invention, database 38 may be capable of storing a single data record or multiple data records. If database 38 stores only a single data record, the data record is overwritten each time the user submits the command to record the data. In this case, only the most recently-created data record is available for subsequent management. If database 38 is capable of storing multiple data records, separate records are created each time the user submits the command to record the data. Each record is identified by a unique tag, such as a time stamp. In this case, each data record may include either all the data that has been relayed since the commencement of the audio readout or only the data that has been relayed since the last user command to record the data. It is also possible to include a processor, which places the audio data as it is relayed to the user into a buffer (not shown) and only downloads the data records to database 38 as commanded by the user.

Additionally, the data recordation unit 34 may have a buffer 42 into which the data is placed prior to transmission or storage. The use of buffer 42 will reduce the number times database 38 is accessed for the storage and transmission of a single data record or "note".

Once the data is stored in database 38, the data management unit 18 permits the user to manage the data. To interact with the data management and recordation unit 18, the phone network 14 permits the user to connect to the data management and recordation unit 18 via a phone 10 or computer 12, which interacts with the data management unit 36 via the audio processor 30 and interaction unit 40. If the user connects to data recordation and management unit 18 using a phone 10, the interaction unit 40 provides the user with a verbal readout of the status of their saved data. If the user connects to the data recordation and management unit 18 with a computer 12, the data recordation and management unit 17 may provide a verbal readout out and/or a display of the data. Additionally, the computer 12 may connect to the phone network 14 via an Internet web site, a direct dial from the computer 12, or another method.

Once the user is connected to the data management and recordation unit 18, the data management unit 36 provides a readout of the number of data records or notes stored in each folder. This may be accomplished, for example, by the data management unit 36 accessing database 38 and counting the number of "notes" in each folder. The data management unit 36 then directs the interaction unit 40 to provide the information to the user in the appropriate format. If the user called on a phone, then the interaction unit 40 may verbally state, "You have 10 messages in 7 folders. What can I do for you?" Likewise if the user is accessing the data management and recordation unit 18 via the computer 12, the message may be displayed on the screen of the user's computer and/or transmitted verbally.

Next, the user begins to issue data management commands, which are transmitted to the data management unit 36 via the audio processor 30, as described above with respect to the data recordation unit 34. The data management commands include browse a list of "notes", reading or opening the "notes", transmitting "notes", organizing the data according to the user's request and other data management techniques.

The data management unit 36 is responsive to the commands as described above. If the user wishes to browse the notes, the user must state, for example "browse", and the data management unit 36 sends the text data from the header of the note to the interaction unit 40, which performs a text to speech conversion for users on phones and reads out the text of the header of the note as described above. If the user is using the computer 12, the interaction unit 40 may also provide the data to the user as text for display on the computer screen.

After completing the browse function or any other function, the data management unit 36 may direct the interaction unit 40 to state "What next?" In response, the user may ask for a particular note to be read out. Then, the data management unit 36 will read out the note using the methods discussed above to read out the header data. The user may also instruct the data management unit 36 to organize or list the notes in a particular order such as alphabetical of most recent recordings or another method of organizing the data. After which, the data management unit 36 may direct the interaction unit 40 to read out the header data as discussed above.

The data management unit 36 also will delete records or notes in response to the user's commands to delete a particular method. Additionally, the data management unit 36 may provide electronic transmissions of data to the specified recipients as instructed by the user. Upon receipt of the command, the data management unit 36 retrieves the note to be transmitted and then interacts with the user and transmits the note, as discussed above.

This invention offers a phone user, who is retrieving an audio readout of data (whether recorded or TTS) contained in the computer network, the added benefits of being able to create a customized log of the data in a database, distribute the data and manage the data. Thus, the user does not need to rely on their ability to remember the data, make handwritten notes, or repeatedly access the same audio readout.

The invention being thus described, it will be obvious that the same may be varied in many ways. For example, since the software implementing the invention is portable and network configurations may be varied, it is possible to organize the invention such that data processing occurs in different places. Such variations are not to be regarded as a departure from the spirit and scope of the invention, and all such modifications are intended to be included within the scope of the following claims.

What is claimed:

1. A method of creating customized recorded audio readout data relayed from a first database over a network to a user, said method comprising:

sending audio readout data from the first database over the network to the user, the first database includes an interactive voice response system or distributed database associated with a computer network, the first database being remote from the user;

receiving a first audio command at a data management and recordation unit remote from the user and associated with a phone network from the user to record selected portions of the audio readout data sent over the network from the first database, the data management and recordation unit includes a second database, the data management and recordation unit being remote from the first database;

interpreting the first audio command at the data management and recordation unit;

recording the selected portions of the audio readout data sent over the network from the first database in the second database remote from the user in response to the interpreted audio command; and distributing the selected portions of the audio readout data in response to a second audio command from the user to at least one user specified recipient, the at least one user specified recipient is other than the user, the second audio command specifying whether the distribution is one of facsimile, voice mail, and electronic message, the second audio command being performable by the user when the audio readout data is being readout to the user.

2. The method of claim 1, wherein the first and second audio commands are voice commands.

3. The method of claim 1, wherein the first and second audio commands are tones.

4. The method of claim 1, wherein the selected data is stored as a binary recorded audio file.

5. The method of claim 1, wherein the selected data is stored as a text file.

6. A method of managing user customized recorded audio readout data relayed from a first database over a network to a user, said method comprising:

storing the user customized recorded audio readout data relayed from the first database over the network to the user in a second database associated with a data management and recordation unit, the data management and recordation unit being remote from the user and associated with a phone network, the first database being remote from the user, the data management and recordation unit being remote from the first database;

distributing the user customized recorded audio readout data in response to an audio command at the data management and recordation unit from the user to distribute the user customized recorded audio readout data to at least one user specified recipient, the at least one user specified recipient is other than the user, the first database includes an interactive voice response system or distributed database associated with a computer network, the audio command specifying whether the distribution is one of facsimile, voice mail and electronic message, the audio command being performable by the user when audio readout data is being readout to the user; and providing a list of the user customized recorded data.

7. The method of claim 6, further comprising:
organizing the user customized recorded data in response to user input.

8. The method of claim 6, wherein providing the list of user customized recorded data includes providing an auditory list.

9. The method of claim 6, wherein providing the list of user customized recorded data includes providing a visual list.

10. The method of claim 6, wherein providing the list of user customized recorded data includes providing a list of all stored data and a list of most recently stored data.

11. The method of claim 6, wherein the user customized recorded data is a binary recorded audio file.

12. The method of claim 6, wherein the user customized recorded data is a text file.

13. A method of creating and managing recorded user customized audio readout data relayed from a first database over a network to a user, said method comprising:

sending audio readout data from the first database over the network to the user, the first database includes an interactive voice response system or distributed database associated with a computer network, the first database being remote from the user;

receiving a first audio command at a data management and recordation unit remote from the user and associated with a phone network from the user to record selected portions of the audio readout data sent over the network from the first database, the data management and recordation unit includes a second database, the data management and recordation unit being remote from the first database;

recording the selected portions of the audio readout data sent over the network from the first database as user customized audio readout data, in the second database remote from the user upon receipt of the first audio command;

distributing the selected portions of the audio recorded readout data in response to a second audio command from the user to at least one user specified recipient, the at least one user specified recipient is other than the user, the second audio command specifying whether the distribution is one of facsimile, voicemail, and electronic message, the second audio command being performable by the user when the audio readout is being readout to the user; and providing a list of the user customized data.

14. The method of claim 13, further comprising:
editing the selected data in response to user input.

15. The method of claim 13, wherein the selected data is stored in the second database as a binary recorded audio file.

16. The method of claim 13, wherein the selected data is stored in the second database as a text file.

17. A method of editing recorded customized audio readout data relayed from a first database over a network to a user, said method comprising:

sending audio readout data from the first database over the network to the user, the first database includes an interactive voice response system or distributed database associated with a computer network, the first database being remote from the user;

prompting the user to designate a beginning and end of a segment of a complete audio readout in response to receiving a first audio command from the user to record selected portions of the audio readout data sent over the network from the first database;

storing the segment in a second database associated with a data management and recordation unit, the data management and recordation unit being remote from the user and associated with a phone network, the data management and recordation unit being remote from the first database, wherein the stored segment is transmitted, deleted, or edited; and distributing the stored segment of the audio readout data in response to a second audio command from the user to at least one user specified recipient, the at least one user specified recipient is other than the user, the second audio command specifying whether the distribution is one of facsimile, voice mail, and electronic message, the second audio command being performable by the user when the audio readout data is being readout to the user.

18. The method of claim 17, further comprising:
storing a temporary copy of the complete audio readout in a temporary buffer for use in editing.

19. The method of claim 17, further comprising:
providing editing functions.

20. The method of claim 19, wherein the editing functions include Fast Forward, Rewind and Search On Keyword.

21. The method of claim 17, wherein the segment is stored as a separate binary recorded audio file.

22. The method of claim 17, wherein the segment is stored as a separate text file.

23. An apparatus for creating and managing user customized recorded audio readout data relayed from a first database over a network to a user, comprising:

a data management service for sending audio readout data over the network from the first database to the user, the first database includes an interactive voice response system or distributed database associated with a computer network first database being remote from the user;

a data storage unit remote from the user;

a data recordation unit remote from the user and associated with the data storage unit for receiving a first audio command from the user to record selected portions of the audio readout data sent over the network from the first database and recording the selected portions of the audio readout data in the data storage unit in response to the first audio command, the data recording unit being remote from the first database; and a data management unit for distributing the selected portions of the recorded audio readout data in response to a second audio command from the user to at least one user specified recipient, the at least one user specified recipient is other than the user, the data management unit being remote from the first database, the second audio command specifying whether the distribution is one of facsimile, voice mail, and electronic message, the second audio command being performable by the user when the audio readout data is being readout to the user, providing a list of the recorded audio readout data, and organizing the recorded audio readout data in response to user input.

24. An apparatus for creating and managing user customized recorded audio readout data relayed from a first database over a network to a user, comprising:

a data management service for sending audio readout data over the network from the first database to the user, the first database includes an interactive voice response system or distributed database associated with a computer network, the first database being remote from the user;

a data storage unit remote from the user;

a data recordation unit remote from the user and associated with the data storage unit for receiving a first audio command to record selected portions of the audio readout data sent over the network from the first database and recording the selected portions of the audio readout data in the data storage unit upon receipt of the first audio command, the data recordation unit being remote from the first database; and a data management unit for distributing the selected portions of the audio readout data to at least one other database in response to a second audio command, the data management unit being remote from the first database, the second audio command specifying whether the distribution is one of facsimile, voice mail, and electronic message, the second audio command being performable by the user when the audio readout data is being readout to the user, providing a list of the selected audio readout data, and editing the selected portions of the audio readout data remotely in response to audio user input.

25. An apparatus for creating and managing recorded customized audio readout data relayed from a first database over a network to a user, comprising:

a data management service for sending audio readout data over the network from the first database to the user, the first database includes an interactive voice response system or distributed database associated with a computer the first database being remote from the user;

a data storage unit remote from the user;

an interaction unit for authenticating the user, transmitting data to the user, and prompting for user audio input data;

a data recordation unit for, upon receipt of a first audio command from the user, recording in the data storage unit audio readout data sent over the network from the first database, the data recordation unit being remote from the first database and the user;

a data management unit for, upon receipt of a second audio command from the user, organizing and editing the audio readout data in the data storage unit and distributing the user recorded audio readout data in response to a third audio command from the user to at least one user specified recipient, the data management unit being remote from the first database, the at least one user specified recipient is other than the user, the third audio command specifying whether the distribution is one of facsimile, voice mail, and electronic message, third audio command being performable by the user when the audio readout data is being readout to the user; and an audio processor including a tone/speech recognition unit for translating received tone/speech commands to a command format usable by the data recordation unit and the data management unit.

* * * * *

UNITED STATES PATENT AND TRADEMARK OFFICE
CERTIFICATE OF CORRECTION

PATENT NO. : 7,653,181 B2  Page 1 of 1
APPLICATION NO. : 10/144727
DATED : January 26, 2010
INVENTOR(S) : Beasley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this

Fourth Day of January, 2011

David J. Kappos
*Director of the United States Patent and Trademark Office*